US012792223B2

(12) United States Patent
Chen et al.

(10) Patent No.: US 12,792,223 B2
(45) Date of Patent: Nov. 10, 2026

(54) ADJUSTING ERASE AMPLIFICATION OF A MEMORY DEVICE

(71) Applicant: MICRON TECHNOLOGY, INC., Boise, ID (US)

(72) Inventors: Che Chen, Boise, ID (US); Gary F. Besinga, Boise, ID (US); Tawalin Opastrakoon, Boise, ID (US); Michael G. Miller, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/975,459

(22) Filed: Dec. 10, 2024

(65) Prior Publication Data

US 2026/0161300 A1 Jun. 11, 2026

(51) Int. Cl.
*G06F 3/06* (2006.01)

(52) U.S. Cl.
CPC ............ *G06F 3/0616* (2013.01); *G06F 3/064* (2013.01); *G06F 3/0679* (2013.01)

(58) Field of Classification Search
CPC ....... G06F 3/0616; G06F 3/064; G06F 3/0679
USPC ......................................................... 711/103
See application file for complete search history.

(56) References Cited

U.S. PATENT DOCUMENTS

| | | | | |
|---|---|---|---|---|
| 9,372,632 | B2 | 6/2016 | Lassa | |
| 10,082,965 | B1 | 9/2018 | Tamilarasan et al. | |
| 11,138,124 | B2 | 10/2021 | Tomic et al. | |
| 11,176,036 | B2 | 11/2021 | Camp et al. | |
| 11,762,569 | B2 | 9/2023 | Stoica et al. | |
| 12,504,884 | B2 * | 12/2025 | Wang | G06F 3/0616 |
| 2015/0186072 | A1 * | 7/2015 | Darragh | G11C 16/3495 711/103 |
| 2018/0293001 | A1 * | 10/2018 | Muchherla | G11C 16/12 |
| 2025/0147670 | A1 * | 5/2025 | Bernat | G06F 11/3409 |

* cited by examiner

*Primary Examiner* — Hua J Song
(74) *Attorney, Agent, or Firm* — Lowenstein Sandler LLP

(57) ABSTRACT

A method for improving endurance of a memory sub-system including tuning, by a controller, a wear ratio for a single-level cell (SLC) mode of a quad-level cell (QLC) memory device with multilevel caching. The method includes tracking Program/Erase Cycle (PEC) counts accumulated for SLC operations and QLC operations for each superblock of the memory sub-system and calculating an average PEC based on the tracked PEC counts. The method also includes calculating an erase amplification (EA) based on the average PEC.

17 Claims, 5 Drawing Sheets

200

| MEM SUB-SYSTEM PEC | DYNNAMIC SUPERBLOCK PEC COUNT | | |
|---|---|---|---|
| | SLC | TLC | QLC |
| SB_0 | A_0 | B_0 | C_0 |
| SB_1 | A_1 | B_1 | C_1 |
| SB_2 | A_2 | B_2 | C_2 |
| .... | ... | ... | ... |
| SB_N-1 | A_N-1 | B_N-1 | C_N-1 |

FIG. 2

300

| Drive Satus | WR (SLC:TLC:QLC) | Dynamic Bulk EA | EA improvement percentage |
|---|---|---|---|
| 100LS | X:Y:Z=1 | EA_reduced | (1-EA_reduced/EA_original)*100% |
| 100LS | 1:1:1 | EA_original | 100% |

FIG. 3

ADJUSTING ERASE AMPLIFICATION OF A MEMORY DEVICE

TECHNICAL FIELD

This disclosure relates to adjusting an erase amplification of a memory device to increase an endurance of the memory device.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

Endurance of a memory sub-system (alternatively referred to as drive endurance) refers to the total amount of data that can be written to a storage device over the lifetime of the storage device before the storage device is expected to fail or become unreliable. For solid-state drives (SSDs) and other Not-AND (NAND)-based storage devices, endurance is typically measured in Total Bytes Written (TBW). The endurance of a memory sub-system is determined by the type of NAND flash memory used, such as Single-Level Cell (SLC), Triple-Level Cell (TLC) or Quad-Level Cell (QLC), with each type having different Program/Erase cycle (PEC) limits. Manufacturers often provide endurance ratings as part of the specifications for the memory sub-system to help users understand an expected lifespan of the memory sub-system.

BRIEF DESCRIPTION OF THE DRAWINGS

FIG. 2 illustrates an example of a log to track Program/Erase Cycle (PEC) counts of superblocks in a memory sub-system that employs multilevel caching.

FIG. 3 illustrates an example of a chart illustrating an impact that changing a wear ratio has on an erase amplification of a memory sub-system employing multilevel caching.

DETAILED DESCRIPTION

Figure 1:
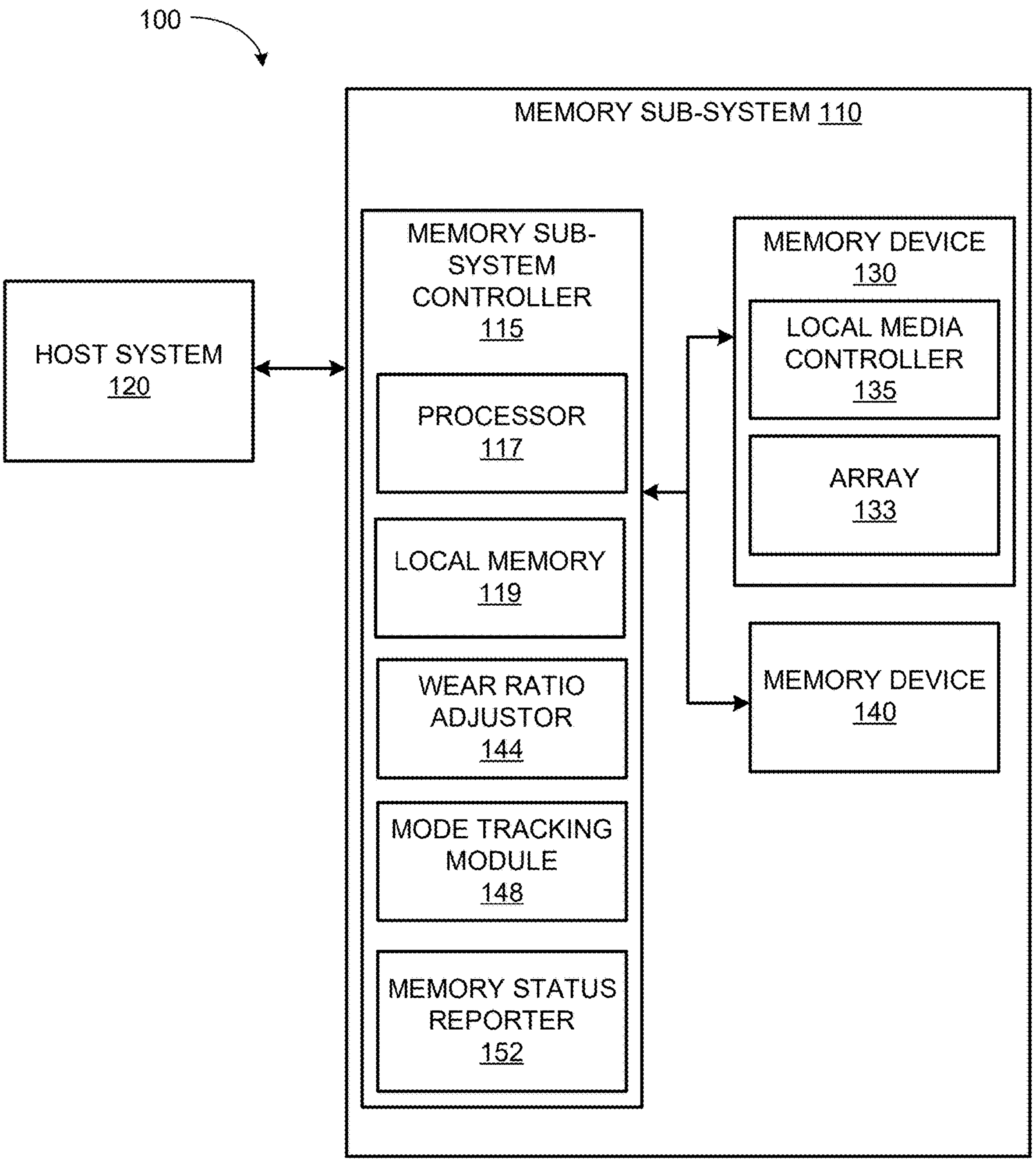
FIG. 1 illustrates a system that includes a memory sub-system that leverages a wear ratio of cells to increase endurance of the memory sub-system.

This description is related to leveraging a tuned cell wear ratio to address the limited endurance of a Quad-Level Cell (QLC) memory device (e.g., a Not-AND (NAND) memory device) for a memory sub-system, such as a solid-state drive (SSD). The QLC memory device of the memory sub-system implements multilevel caching, and has a wear ratio tuned such that Single-Level Cell (SLC) operations cause less wear than QLC operations. A mode tracking module is implemented to log Program/Erase Cycle (PEC) counts for different block types (SLC, Triple-Level Cell (TLC) or QLC) for each superblock in the memory sub-system. A tuned Erase Amplification (EA) calculation that incorporates these wear ratios is employed to a achieve lower overall EA and potentially higher Total Bytes Written (TBW). By dynamically utilizing different cell modes based on corresponding wear characteristics, the system of the present description improves endurance (e.g., lifespan) and performance of the memory sub-system.

More generally, some examples of a memory sub-system (e.g., an SSD) include high density non-volatile memory devices where retention of data is desired during intervals of time where no power is supplied to the memory device. One example of non-volatile memory devices is a Not-AND (NAND) memory device that can be implemented in an SSD. A non-volatile memory device is a package that includes a die(s). Each such die can include a plane(s). For some types of non-volatile memory devices (e.g., NAND memory devices), each plane includes a set of physical blocks, and each physical block includes a set of pages that are organized in wordlines. Each page includes a set of memory cells, which are commonly referred to as cells. A cell is an electronic circuit that stores information. A cell stores at least one bit of binary information and has various logic states that correlate to the number of bits being stored. The logic states are represented by binary values, such as '0' and '1', or as combinations of such values, such as '00', '01', '10' and '11'.

A memory device includes multiple cells arranged in a two-dimensional or a three-dimensional grid. In some examples, memory cells are formed on a silicon wafer in an array of columns connected by conductive lines (also referred to as bitlines, or BLs) and rows connected by conductive lines (also referred to as wordlines or WLs). A wordline has a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. An SSD is an example of a memory sub-system that includes a non-volatile memory device(s) and a memory sub-system controller to manage the non-volatile memory device(s).

In the memory sub-system, superblocks refer to logical groupings of memory blocks that combine multiple physical blocks from different memory devices (e.g., different memory chips) or from different planes within a single memory device (e.g., a single chip). Thus, a superblock represents a larger organizational unit in NAND flash memory formed of multiple blocks. The employment of superblocks enhances data management and wear leveling by distributing write and erase cycles across a broader array of memory cells. Superblocks facilitate efficient handling of data, allowing for simultaneous operations over multiple blocks, which tunes the performance and endurance of the memory sub-system, which can improve overall performance and wear leveling in flash memory systems.

Superblocks enable more efficient management of flash memory by providing a larger organizational unit for grouping and managing multiple blocks. This larger unit enables improved performance. Superblocks allow for more efficient tracking of operations across larger units of storage, potentially reducing system overhead. The flexibility of superblocks enables different programming or erasing modes to be applied independently to each superblock, allowing for tuned usage of storage resources. By managing larger units of storage, superblocks provide a balance between fine-grained control and system efficiency. Operating on superblocks rather than individual blocks can potentially reduce the number of management operations required, leading to improved overall system performance.

Multilevel caching refers to a caching system in memory devices (e.g., QLC memory devices) that allows for dynamic use of different cell modes, including SLCs, TLC and QLC modes. This multilevel caching enables a flexible and efficient use of the memory devices (e.g., NAND flash memory) by allowing the drive to utilize different cell modes based on wear characteristics and performance requirements.

Each superblock can be dynamically programmed or erased in different modes (SLC, TLC or QLC) independently of other superblocks, allowing for flexible utilization of the multilevel cache. A PEC log is maintained for each superblock, tracking the accumulated PEC for different block types (SLC, TLC and QLC) within each superblock. The tracking of the mode at the superblock level enables the memory sub-system to efficiently manage and use different cell modes in the multilevel cache, potentially improving overall drive endurance and performance.

A memory page in the context of non-volatile memory devices, such as NAND memory, refers to a smallest writable and readable unit within the memory structure. Each memory page is formed with numerous memory cells where data is stored. In NAND memory, for example, a memory page is where actual user data gets written along with additional metadata used for managing the memory and ensuring data integrity. This metadata might include error correction codes (ECC) that help detect and correct errors that might occur during data read/write cycles. The size of a memory page can vary depending on the specific type of memory technology and the manufacturer's design. Common page sizes in NAND flash memory range from 4 KB to 16 KB or more.

The memory sub-system controller is configured/programmed to encode host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a codeword. LDPC encoding refers to an encoding method that utilizes a low density parity check (LDPC) code to generate the parity bits.

Additionally, the memory sub-system controller can decode codewords, as part of a read operation, stored at the memory device(s) of the memory sub-system. Decoding refers to a process of reconstructing the original embedded data (e.g., sequence of binary bits) from the codeword (e.g., the encoded original embedded data) received from storage at the memory device(s). LDPC decoding refers to a decoding method that utilizes the LDPC code to reconstruct the original embedded data.

QLC memory devices have limited endurance, with a lower Program/Erase Cycle (PEC) count of approximately 1.3 k, as compared to TLC memory devices that have a PEC of about 3 k. This lower endurance results in memory sub-systems (e.g., SSDs) that employ QLC memory devices having a reduced Total Bytes Written (TBW) ratings for the same drive density, restricting QLC drives to value product segments. Increasing block sizes in QLC memory devices exacerbate the situation, leading to less efficient drive folding and higher EA, further reducing TBW endurance.

To compensate for the lower PEC in QLC memory devices, a tuned cell wear ratio in the memory sub-system is leveraged to improve endurance and performance, such that the wear ratio is less than 1 for SLC operations (and/or TLC operations, in some examples). The memory sub-system tunes the QLC memory device to achieve a wear ratio where SLC operations cause less wear than QLC operations, improving the wear ratio to be lower than 1 for more efficient use of memory cells in the memory devices of the memory sub-system.

The wear ratio of QLC memory devices with multilevel caching can be tuned by adjusting various parameters related to programming and erasing operations. The wear ratio of non-volatile memory devices characterizes the relative cell wear caused by different programming modes. Specifically, in the examples described herein, the wear ratio is defined as the ratio of cell wear caused by one program/erase cycle in SLC mode compared to one program/erase cycle in QLC mode. In the examples described, the wear ratio for SLC operations is tuned to be lower than the wear ratio for QLC operations (e.g., lowering to the wear ratio to less than 1), such that SLC operations cause less wear on the memory cells than QLC operations. Lowering the wear ratio to less than 1 involves modifying several aspects of cell operations. Adjusting a read time (tR) and erase time (tBers) for SLC operations may help in reducing wear. Fine-tuning waveforms used for programming and erasing operations in SLC mode can help reduce cell wear compared to QLC operations. These adjustments aim to make SLC operations less stressful on the cells of the memory devices compared to QLC operations, thereby achieving a wear ratio lower than 1. Additionally, in some examples, the wear ratio of TLC mode operations can be tuned (adjusted) using similar parameters, namely a programming time (tProg), a read time (tR), an erase time (tBers), a program voltage and/or the erase depth for TLC operations.

Furthermore, the memory controller includes a tracking module that logs PEC counts for different block types (SLC, TLC, QLC) for each superblock in the memory sub-system, enabling an accurate management of cell wear. The memory sub-system utilizes a tuned EA calculation incorporating these wear ratios to improve Total Bytes Written (TBW) to the memory sub-system. By dynamically utilizing different cell modes (SLC, TLC, QLC) in superblocks based on wear characteristics, the memory sub-system improves drive lifespan and performance. The wear ratio concept is incorporated into PEC calculations to more accurately reflect actual NAND cell wear, providing a more precise representation of drive endurance.

FIG. 1 illustrates a system 100 that includes a memory sub-system 110 that can be a storage device, a memory module or a hybrid of a storage device and a memory module. Examples of a storage device include a solid-state drive (SSD), a flash drive, a universal serial bus (USB) flash drive, an embedded Multi-Media Controller (eMMC) drive, a Universal Flash Storage (UFS) drive and a secure digital (SD) card. Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1 illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-volatile, non-transitory computer readable media. The memory device 130 and the memory device 140 can include any combination of the different types of non-volatile memory devices. Some examples of non-volatile memory devices (e.g., memory device(s) 130) include Not-AND (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include an array 133 (or multiple arrays) of memory cells. One type of memory cell, for example, single level cells (SLC) can store one bit per cell. Other types of memory cells, such as multilevel cells (MLCs), triple level cells (TLCs), quad-level cells (QLCs), can store multiple bits per cell. In some examples, each of the memory devices 130 can have a combination of different types of memory cells such as SLCs, MLCs, TLCs, QLCs or some combination thereof. For instance, in some examples, a particular memory device can include an SLC portion, an MLC portion, a TLC portion and/or a QLC portion of memory cells. The memory cells of the memory devices 130 can be grouped as pages that can refer to a logical unit of the memory device used to store data. In some types of memory (e.g., NAND), pages can be grouped into wordlines and blocks.

In the memory sub-system 110, superblocks are defined as logical assemblies of data blocks that integrate multiple physical blocks from the memory device 130 and the memory device 140 (e.g., different memory chips) or from distinct planes within a single memory device 130 (e.g., a single chip). The utilization of superblocks improves data management and wear leveling by evenly distributing write and erase cycles across the cells of the array 133. Superblocks enable efficient data handling by allowing contemporaneous operations across multiple blocks, which enhances the performance and longevity of the memory sub-system 110.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 (alternatively referred to as a memory controller or a controller for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

The memory sub-system controller 115 executes several operations to execute a write command to the memory device(s) 130. In particular, the memory sub-system controller 115 receives the write command from the host system 120 via the physical host interface. The write command includes user data (e.g., host data). The memory sub-system controller 115 then encodes the user data and other data (e.g., parity data) into a format suitable for storage in the memory device 130. This encoding process involves generating parity bits from the embedded data using an ECC and combining the parity bits of the other data with the user data to create a codeword. If the memory sub-system controller 115 employs LDPC encoding, the memory sub-system controller 115 generates the parity bits using an LDPC code.

The memory sub-system controller 115 then sends the codeword to the memory device(s) 130. Within the memory device(s) 130, the local media controller 135 receives the codeword data and manages the actual writing process to the array 133. The codeword is written to the array 133, which is formed with memory cells organized into pages, which range in size from 4 KB to 16 KB or more. The codeword is stored in the memory cells of the array 133 as electrical charges in floating gates or charge traps. Each cell can hold different charge levels, representing distinct bit values. In situations where the memory device 130 employs multilevel cell technologies, such as QLC, multiple bits are stored in a single cell using different voltage levels.

More specifically, a read command from the memory device 130 causes the memory sub-system controller 115 to execute several operations. The memory sub-system controller 115 receives the read command from the host system 120 via the physical host interface. In response, the memory sub-system controller 115 sends the read command to the memory device(s) 130 that include the memory addresses specified in the read command. The local media controller 135 manages the actual reading process from the array 133.

The memory devices 130 and 140 employ QLC technology, along with multilevel caching. These QLC memory devices 130 and 140 have limited endurance, with a lower Program/Erase Cycle (PEC) count of approximately 1.3 k compared to TLC memory devices with a PEC of about 3 k. This lower endurance results in the memory sub-system 110 having reduced Total Bytes Written (TBW) ratings as compared to a memory sub-system that employs TLC memory devices. The problem is exacerbated by increasing block sizes in QLC memory devices, which lead to less efficient drive folding and higher Erase Amplification (EA) in the memory devices 130 and 140, further reducing TBW endurance. More generally, the EA is defined as the ratio between the amount of data erased from the memory devices 130 and 140 and the amount of data written by the host 120. A lower EA value indicates better efficiency, as the lower EA indicates that less data is being erased for each write operation. Conversely, a higher EA value suggests that more data is being erased than necessary, which can lead to increased wear on the memory cells of the memory devices 130 and 140 and reduced overall endurance of the memory sub-system 110.

Accordingly, the memory sub-system controller 115 is programmed/configured to leverage multilevel caching for the memory devices 130 and 140 to compensate for the limited PEC count of the QLC memory devices 130 and 140. Multilevel caching refers to a caching system implemented in the memory sub-system controller 115 that allows for dynamic use of different cell modes in the memory devices 130 and 140. Multilevel caching enables the memory sub-system 110 to utilize SLC, TLC and QLC modes for superblocks of the memory devices 130 and 140 based on wear characteristics and performance requirements. The memory sub-system controller 115 manages the multilevel cache through components such as a wear ratio adjustor 144 and a mode tracking module 148. The wear ratio adjustor 144 and the mode tracking module 148 operate in concert to implement the multilevel caching for the superblocks, which includes dynamically allocating and managing storage using different cell modes to tune the balance between performance, endurance and capacity.

Performance requirements that could cause dynamic adjustment of superblocks include read/write speed requirements, endurance requirements, capacity requirements, workload characteristics and temperature or power constraints. More specifically, the memory sub-system controller 115 can allocate more superblocks to the SLC mode when higher performance is needed, as SLC operations are typically faster than QLC operations. Additionally, if certain data needs to be written frequently, the memory sub-system controller 115 could be programmed to allocate those superblocks to SLC mode to take advantage of the lower wear ratio and extend the overall lifespan of the drive. Conversely, if more storage capacity is needed, the memory sub-system controller 115 could dynamically allocate more superblocks to QLC mode to maximize data density. The memory sub-system controller 115 could be configured to adjust superblock allocation based on whether the current workload is read-intensive or write-intensive to tune performance and endurance. Additionally or alternatively, in situations where the memory sub-system 110 needs to operate under specific temperature or power limits, the memory sub-system controller 115 could adjust superblock allocation to balance performance and power consumption. These dynamic adjustments allow the memory sub-system controller 115 to achieve a satisfactory balance between performance, endurance and capacity based on real-time requirements and usage patterns.

In the multilevel cache system, each superblock in the memory devices 130 and 140 can be independently programmed or erased in different modes (SLC, TLC, or QLC). The mode tracking module 148 maintains a detailed Program/Erase Cycle (PEC) log for each superblock of the memory sub-system 110 (the superblocks are stored in the memory devices 130 and 140), tracking the accumulated PEC for different block types (SLC, TLC, QLC) within each superblock. This granular tracking at the superblock level enables the memory sub-system controller 115 to efficiently manage and optimize the use of different cell modes in the multilevel cache.

FIG. 2 illustrates an example of a log 200 (alternatively referred to as a PEC log) tracking PEC counts of superblocks in the memory sub-system 110 that employs multilevel caching. The log 200 can be maintained by the mode tracking module 148, and the log 200 can be stored in the local memory 119. The log 200 has the PEC count for N number of superblocks (SB0 . . . SB_N−1), where N is an integer greater than one. The log 200 contains a PEC count for 3 different modes, SLC, TLC and QLC. The SLC PEC counts are labeled as A_0 . . . A_N−1, the TLC PEC counts are labeled as B_0 . . . B_N−1 and the QLC PEC counts are labeled as C_0 . . . C_N−1. The SLC, TLC and QLC PEC counts are each integer values representing a number of PECs that each corresponding superblock executed for a particular mode. Moreover, the memory sub-system 110 is configured such that each superblock, SB_0 . . . SB_N−1 has 1 type of cell at a given time, but these types can change over time.

As an example, from time to (e.g., an initial time) to time t1, a first superblock SB_0 may be operating in SLC mode, such that each cell in the first superblock SB_0 is an SLC. Thus, during a time interval from time t0 to time t1, the first superblock SB_0 operates in the SLC mode, and the value for A_0 increases for each program/erase cycle executed. Additionally, in one example, at time t1, the first superblock SB_0 can change modes to the TLC mode, such that the cells of the first superblock SB_0 are TLCs. Thus, during an interval of time t1 to t2, the first superblock SB_0 operates in the TLC mode, and the value for B_0 increases for each TLC program/erase cycle executed. Further, continuing with this example, at time t2, the first superblock SB_0 can change to the QLC mode, such that cells of the superblock SB_0 are QLCs. Thus, during an interval of time from t2 to t3, the first superblock SB_0 operates in the QLC mode, and the value for C_0 increases for each QLC program/erase cycle executed. Further, in this example, at time t4, the first superblock SB_0 can switch back to the SLC mode. Thus, during an interval from t4 to t5, the first superblock SB_0 can operate in the SLC mode (again) and the value for A_0 increases again for each SLC program/erase cycle executed. Thus, the log 200 can provide an accurate record of the PEC count for each individual operating mode (SLC, TLC and QLC).

Referring back to FIG. 1, the wear ratio adjustor 144 tunes the wear ratio between different cell modes, which is a feature of the multilevel caching system. Adjusting a read time (tR) and erase time (tBers) for SLC operations may help in reducing wear. Fine-tuning waveforms used for programming and erasing operations in SLC mode can help reduce cell wear compared to QLC operations. In some examples, the same parameters can be adjusted for the TLC mode as well to reduce the wear ratio for the TLC mode. By tuning these parameters for different modes of operation (e.g., the SLC mode and/or the TLC mode), the wear ratio adjustor 144 can help achieve a wear ratio less than 1, where SLC operations and TLC operations cause less wear than QLC operations, potentially improving the overall endurance of the memory sub-system 110. Moreover, by leveraging the different wear characteristics of these modes, particularly noting that SLC operations typically cause less wear than QLC operations, the multilevel caching for the memory devices 130 and 140 can improve the overall endurance and performance of the memory sub-system 110.

The memory sub-system controller 115 includes a memory status reporter 152 that can calculate the EA (erase amplification) to indicate an efficiency of erase operations in in the memory sub-system 110 compared to the amount of data written. EA is defined as the ratio between the amount of data erased from the memory device and the amount of data written by the host. A lower EA value indicates better efficiency, as the lower EA indicates that less data is being erased for each write operation. Conversely, a higher EA value suggests that more data is being erased than necessary, which can lead to increased wear on the memory cells of the memory devices 130 and 140 and reduced overall endurance of the memory sub-system 110. As noted, because the memory devices 130 and 140 are QLC memory devices, EA has an increased importance due to the limited endurance. The EA is based on an average PEC, $PEC_{avg}$ for the QLC memory devices 130 and 140 that can also be calculated by the memory status reporter 152. Equations 1 and 2 are employable to calculate the EA and the $PEC_{avg}$ for the QLC memory devices 130 implementing multilevel caching.

$$PEC_{avg} = \left(X * \sum_{i=0}^{N-1} A_i + Y * \sum_{i=0}^{N-1} B_i + Z * \sum_{i=0}^{N-1} C_i\right) / N \quad \text{Equation 1}$$

wherein:

N is the number of superblocks in the memory sub-system 110;

X represents the wear ratio for SLC operations;

Y represents the wear ratio for TLC operations;

Z represents the wear ratio for QLC operations;

$X \leq Y \leq Z$, and $Z=1$;

Ai is a PEC count for superblocks operating in the SLC mode, such as the A_0 . . . A_N−1 values extracted from the log 200;

Bi is a PEC count for superblocks operating in the TLC mode, such as the B_0 . . . B_N−1 values extracted from the log 200; and Ci is a PEC count for superblocks operating in the QLC mode, such as the C_0 . . . C_N−1 values extracted from the log 200.

$$EA = \text{Drive\_density} * PEC_{avg}/TBW \qquad \text{Equation 2}$$

wherein:

Drive_density is equal to a capacity of the memory sub-system controller 115;

$PEC_{avg}$ is calculated from Equation 1; and

TBW is the total number of bytes written (in terabytes (TB)) to the memory sub-system 110.

Thus, the memory status reporter 152 can store the $PEC_{avg}$ and the EA for the memory sub-system 110 in the local memory 119. In some examples, the $PEC_{avg}$ and the EA can be output to the host system 120 (or other external system) in response to a request from the host system 120 (or other external system). Furthermore, the memory status reporter 152 can calculate a maximum number of total bytes written, $TBW_{max}$ with Equation 3.

$$TBW_{max} = \text{Drive\_density} * PEC_{max}/EA \qquad \text{Equation 3}$$

wherein:

$PEC_{max}$ is a maximum Program/Erase Cycle count for the memory devices 130 and 140 (e.g., 1.3K as one example).

The $TBW_{max}$, which can alternatively be referred to as an endurance rating for the memory sub-system 110, has a lowest value in situations where X=Y=Z=1. As demonstrated by Equation 3, lowering EA can increase $TBW_{max}$. Further, as demonstrated in Equation 1, $PEC_{avg}$ can be reduced by decreasing X and Y (and X<Y) which indicates that the SLC operations cause less wear on the memory devices 130 and 140 and TLC or QLC operations, and because Y<Z, TLC operations cause less wear on the memory devices 130 and 140 than QLC operations. Moreover, as indicated by Equation 2, lowering of the $PEC_{avg}$, in turn, lowers the EA.

Tuning the wear ratio and leveraging the tuned wear ratio can increase the $TBW_{max}$ for the memory sub-system 110. FIG. 3 illustrates an example of a chart 300 illustrating an impact that changing a wear ratio has on an erase amplification of a memory sub-system employing multilevel caching. The chart 300 illustrates example improvements to the memory sub-system 110. The chart 300 can be generated, for example by the memory status reporter 152 (and/or an external system) and stored in the local memory 119. The chart 300 includes a column of "Drive Status" of 100LS, which indicates that the memory devices 130 and 140 are 100% logically saturated (LS), indicating that the memory devices 130 and 140 are completed filled to represent a "worst-case scenario" for operation of the memory sub-system 110.

Additionally, the chart 300 includes a wear ratio column labeled "WR (SLC:TLC:QLC)" The values for SLC correspond to 'X' in Equation 1, the values for TLC correspond to 'Y' for Equation 1 and the values for QLC correspond to 'Z' for Equation 1. Thus, the values for the wear ratio column is employable to calculate $PEC_{avg}$, which is in turn employable to calculate a dynamic bulk EA (or more simply EA), from Equation 2 that is listed in another column of the chart 300. Finally, a column of the chart 300 labeled "EA Percentage" represents the percentage of the EA achieved by lowering the wear ratio for SLC and TLC (to less than 1). Thus, as demonstrated, in situations where SLC, TLC and QLC are each 1, the EA percentage is 100% (e.g., no improvement, EA of 3.51). However, as demonstratable with Equations 1 and 2, in the example where the SLC wear is X (X<Y), the TLC wear is Y (Y<Z) and the QLC wear is Z(=1), the EA percentage is reduced, showing a improvement to the original EA.

Referring back to FIG. 1, as demonstrated, tuning of the wear ratio for SLC and TLC (e.g., by adjusting a programming time (tProg), read time (tR) and erase time (tBers), a program voltage and/or the erase depth for SLC and/or TLC mode operations, as noted) to adjust waveforms can be leveraged to improve (lower) the EA. Lowering the EA, as demonstrated in Equation 3, improves $TBW_{max}$, thereby increasing the service life of the memory sub-system 110. Furthermore, storing a log (e.g., the log 200) enables analysis of the operation of the memory devices 130 and 140 (and the memory sub-system 110, more generally) after failure of the memory sub-system 110. This analysis can reveal methods to further improve design and/or operation of the memory sub-system 110.

Figure 4:
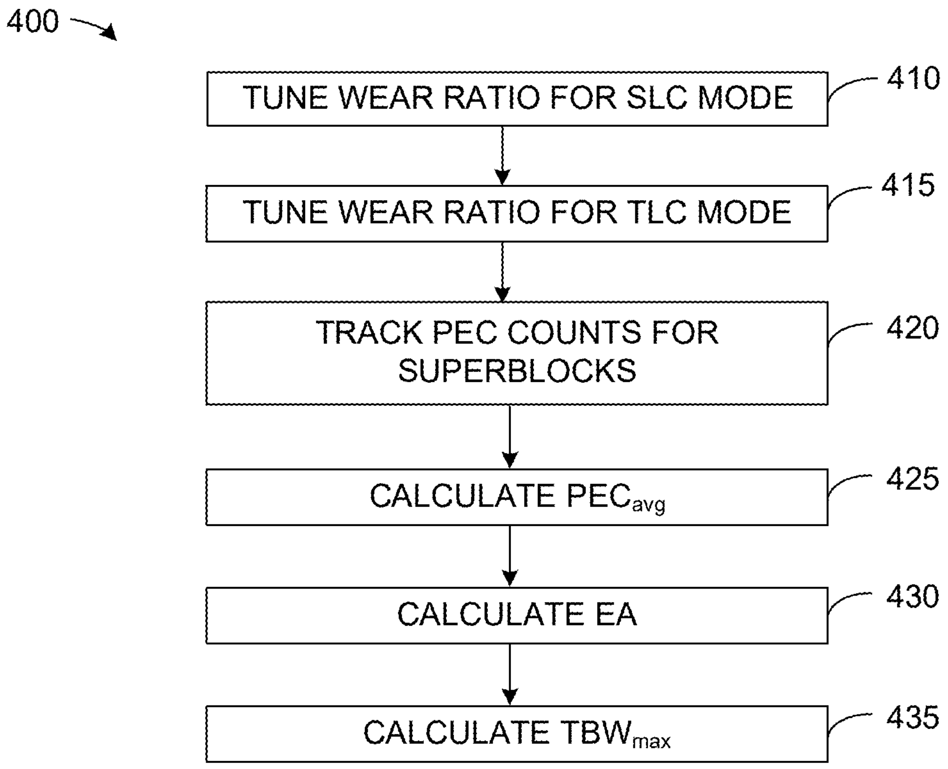
FIG. 4 illustrates a flowchart of an example method for improving the endurance of a memory device of a memory sub-system that implements multilevel caching.

FIG. 4 illustrates a flowchart of an example method 400 for improving the endurance of a QLC memory device that implements multilevel caching, such as the memory devices 130 and 140. Moreover, the method 400 can be implemented with a controller, such as the memory sub-system controller 115. At block 410, a wear ratio adjustor (e.g., the wear ratio adjustor 144) of the controller tunes the wear ratio for SLC mode operations. This tuning includes adjusting parameters such as programming time (tProg), read time (tR), and erase time (tBers) for SLC mode operations and/or TLC mode operations to reduce cell wear compared to QLC operations.

At block 415, the wear ratio adjustor 144 tunes the wear ratio for TLC mode in a similar manner. In some examples, the operations of the block 415 are omitted, such as situations where the controller is configured to only operate in the SLC mode and the QLC mode. The tuning at blocks 410 and 415 aim to achieve wear ratios where X<Y<Z (in Equation 1), with Z typically equal to 1, indicating that SLC operations cause less wear than TLC operations, which in turn cause less wear than QLC operations.

At block 420, a mode tracking module (e.g., the mode tracking module 148) of the controller tracks (e.g., records) the Program/Erase Cycle (PEC) counts for each superblock in the memory sub-system. The mode tracking module 148 maintains a log (e.g., a PEC log) for different block types (SLC, TLC, QLC) within each superblock, such as the log 200.

At block 425, a memory status reporter (e.g., the memory status reporter 152) of the controller calculates the average PEC, $PEC_{avg}$ using Equation 1 for N number of superblocks. At block 430, the memory status reporter 152 calculates the Erase Amplification (EA) (alternatively referred to as a dynamic EA) using Equation 2. At block 435, the memory status reporter calculates the maximum number of Total Bytes Written, $TBW_{max}$ that the memory sub-system can potentially achieve with Equation 3 using the maximum Program/Erase Cycle count (fixed at 1.3K in the example provided). Moreover, as demonstrated by Equations 1-3, lowering $PEC_{avg}$ lowers EA, which in turn raises $TBW_{max}$. Accordingly, the method 400 enables the memory sub-system to leverage the tuned cell wear ratios to achieve lower EA and potentially higher $TBW_{max}$, thereby improving the overall endurance and performance of the memory sub-system that employs QLC memory devices with multi-level caching.

Figure 5:
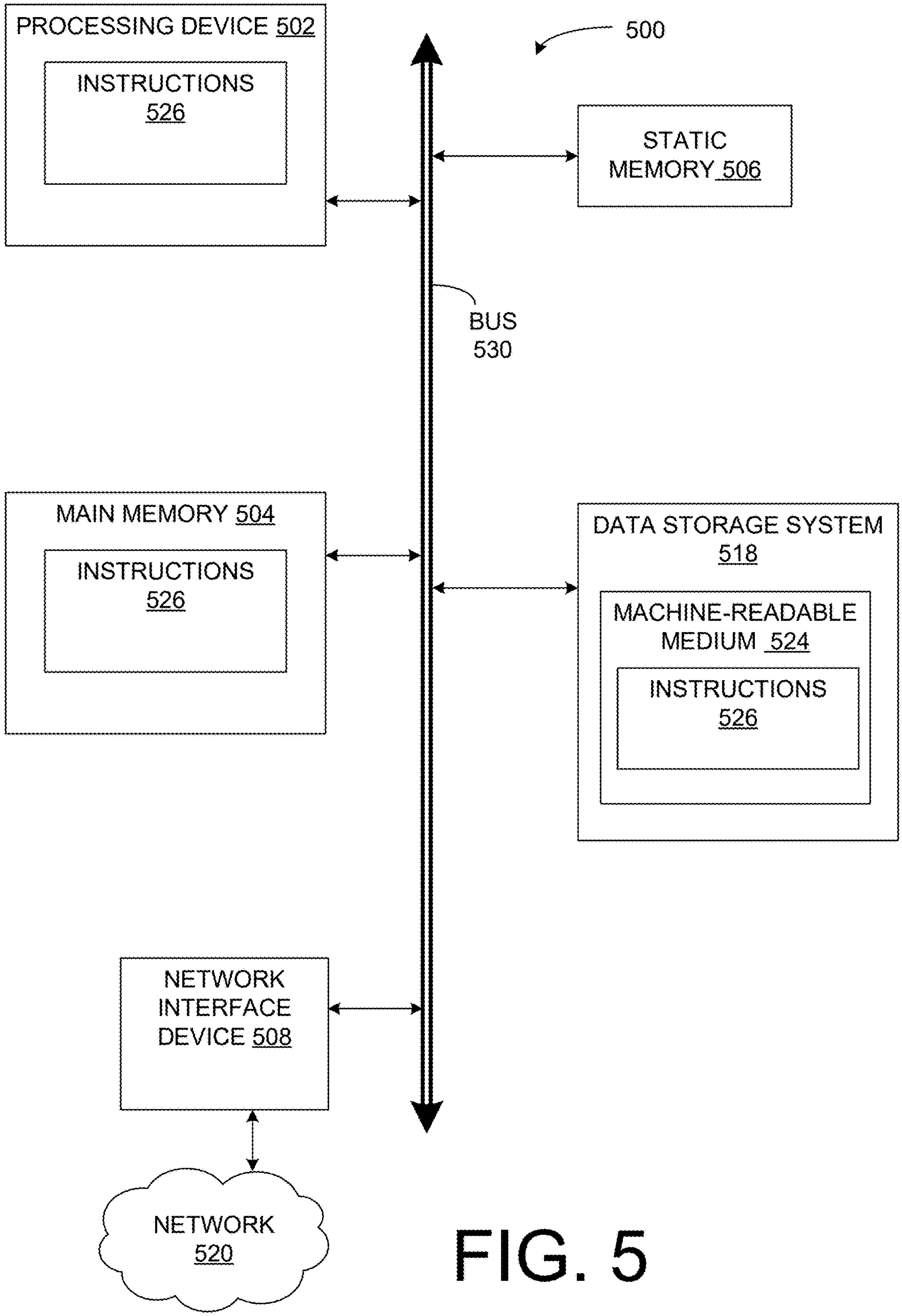
FIG. 5 illustrates an example machine of a computer system (a machine) within which a set of instructions, for causing the machine to perform any one or more of the methodologies discussed herein, can be executed.

FIG. 5 illustrates an example machine of a computer system 500 (a machine) within which a set of instructions, for causing the machine to perform any one or more of the methodologies discussed herein, can be executed. In some examples, the computer system 500 corresponds to a host system (e.g., the host system 120 of FIG. 1) that includes, is coupled to, or utilizes a memory sub-system (e.g., the memory sub-system 110 of FIG. 1) or is used to perform the operations of a controller. In other examples, the machine is connected (e.g., networked) to other machines in a LAN, an intranet, an extranet and/or the Internet. In various examples, the machine operates in the capacity of a server or a client machine in client server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automobile, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM) or other non-transitory computer-readable media) and a data storage system 518, which communicate with each other via a bus 530.

The processing device 502 represents one or more general-purpose processing devices such as a microprocessor, a central processing unit, etc. More particularly, the processing device 502 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 502 is implemented with a special-purpose processing devices such as an application specific integrated circuit (ASIC), a field programmable gate array (FPGA), a digital signal processor (DSP), network processor, etc. The processing device 502 is configured to execute instructions 526 for performing the operations discussed herein. In some examples, the computer system 500 includes a network interface device 508 to communicate over the network 520.

The data storage system 518 includes a machine-readable storage medium 524 (also known as a computer-readable medium) that store sets of instructions 526 or software for executing the methodologies and/or functions described herein. The machine-readable storage medium 524 is a non-transitory medium. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518 and/or main memory 504 can correspond to the memory sub-system 110 of FIG. 1. Accordingly, the machine-readable storage medium 524, the data storage system 518 and/or the main memory 504 are examples of non-transitory computer-readable media.

In some examples, the instructions 526 include instructions to a data write and/or a data integrity scan. While the machine-readable storage medium 524 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for improving endurance of a memory sub-system, the method comprising:

tuning, by a controller, a wear ratio for a single-level cell (SLC) mode of a quad-level cell (QLC) memory device with multilevel caching;

tracking Program/Erase Cycle (PEC) counts accumulated for SLC operations and QLC operations for each superblock of the memory sub-system;

calculating an average PEC based on the tracked PEC counts; and calculating an erase amplification (EA) based on the average PEC, wherein the EA is based on a total capacity of the memory sub-system, the average PEC and a total number of bytes written to the memory sub-system.

2. The method of claim 1, further comprising tuning a wear ratio for a triple-level cell (TLC) mode of the QLC memory device, wherein the wear ratio for the SLC mode is less than a wear ratio for the TLC mode and the QLC mode.

3. The method of claim 1, further comprising calculating a maximum number of total bytes written based on the EA.

4. The method of claim 1, wherein tuning the wear ratio for the SLC mode comprises adjusting a programming time, a read time and/or an erase time for SLC operations.

5. The method of claim 1, wherein the wear ratio for the SLC mode is less than a wear ratio for the QLC mode.

6. The method of claim 1, wherein tracking the PEC counts comprises maintaining a log of accumulated PEC counts for triple-level cell (TLC) operations for each superblock of the memory sub-system.

7. The method of claim 1, further comprising dynamically allocating, by the controller, superblocks to different cell modes based on wear characteristics and performance requirements.

8. A method for improving endurance of a memory sub-system, the method comprising:

tuning, by a controller, a wear ratio for a single-level cell (SLC) mode of a quad-level cell (QLC) memory device with multilevel caching;

tracking Program/Erase Cycle (PEC) counts accumulated for SLC operations and QLC operations for each superblock of the memory sub-system;

calculating an average PEC based on the tracked PEC counts;

calculating an erase amplification (EA) based on the average PEC; and calculating a maximum number of total bytes written based on the EA, wherein the maximum number of total bytes written is based on a total capacity of the memory sub-system, a maximum PEC count for the QLC memory device and the EA.

9. A method for improving endurance of a memory sub-system, the method comprising:

tuning, by a controller, a wear ratio for a single-level cell (SLC) mode of a quad-level cell (QLC) memory device with multilevel caching;

tracking Program/Erase Cycle (PEC) counts accumulated for SLC operations and QLC operations for each superblock of the memory sub-system;

calculating an average PEC based on the tracked PEC counts; and calculating an erase amplification (EA) based on the average PEC, wherein the average PEC is based on PEC counts for SLC, triple-level cell (TLC) and QLC modes and a total number of superblocks in the memory sub-system.

10. A method for improving endurance of a memory sub-system, the method comprising:

tuning, by a controller, a wear ratio for a single-level cell (SLC) mode of a quad-level cell (QLC) memory device with multilevel caching;

tracking Program/Erase Cycle (PEC) counts accumulated for SLC operations and QLC operations for each superblock of the memory sub-system;

calculating an average PEC based on the tracked PEC counts;

calculating an erase amplification (EA) based on the average PEC;

calculating a maximum number of total bytes written based on the EA; and storing, by the controller, the calculated EA and maximum number of total bytes written in a local memory of a memory sub-system controller, wherein the calculated EA and/or the maximum number of total bytes written are output to an external system in response to a request.

11. A system comprising:

a quad-level cell (QLC) memory device configured for multilevel caching; and a controller coupled to the memory device, the controller programmed to:

tune a wear ratio for a single-level cell (SLC) mode of the QLC memory device;

track Program/Erase Cycle (PEC) counts accumulated for SLC operations and QLC operations for each superblock of the memory device;

calculate an average PEC based on the tracked PEC counts; and calculate an erase amplification (EA) based on the average PEC, wherein the average PEC is based on wear ratios and PEC counts for SLC and QLC modes, and a total number of superblocks of the memory device.

12. The system of claim 11, wherein the controller is further configured to calculate a maximum number of total bytes written based on the EA.

13. The system of claim 11, wherein tuning the wear ratio for the SLC mode comprises adjusting a programming time, a read time and/or an erase time for SLC operations.

14. The system of claim 11, wherein the wear ratio for the SLC mode is less than a wear ratio for the QLC mode.

15. The system of claim 11, wherein the controller is further programmed to dynamically allocate superblocks to different cell modes based on wear characteristics and performance requirements.

16. A non-transitory computer-readable medium storing instructions that, when executed by a processor, cause the processor to execute operations, the operations comprising:

tuning a wear ratio for a single-level cell (SLC) mode of a quad-level cell (QLC) memory device with multilevel caching;

tracking program/erase cycle (PEC) counts accumulated for SLC operations and QLC operations for each superblock in a memory sub-system;

calculating an average PEC based on the tracked PEC counts;

calculating an erase amplification (EA) based on the average PEC;

dynamically allocating superblocks to different cell modes based on wear characteristics and performance requirements; and storing the calculated EA, wherein the calculated EA is output to an external system in response to a request.

17. The non-transitory computer-readable medium of claim 16, wherein the operations further comprise tuning a wear ratio for a triple-level cell (TLC) mode of the QLC memory device, wherein the wear ratio for the SLC mode is less than a wear ratio for the TLC mode and the QLC mode.

* * * * *